INVENTOR.
Adolph C. Dressler
BY
ATTORNEYS

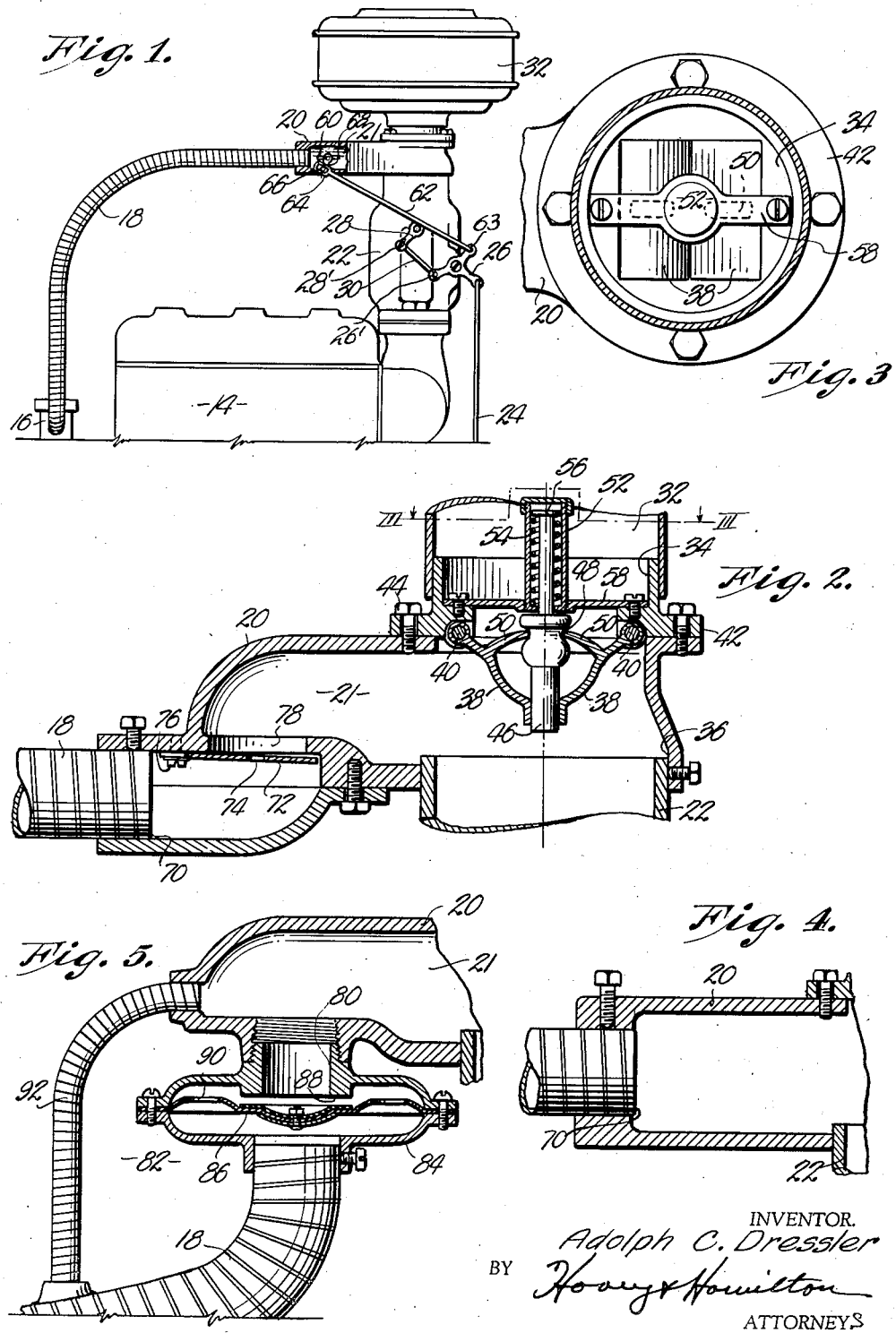

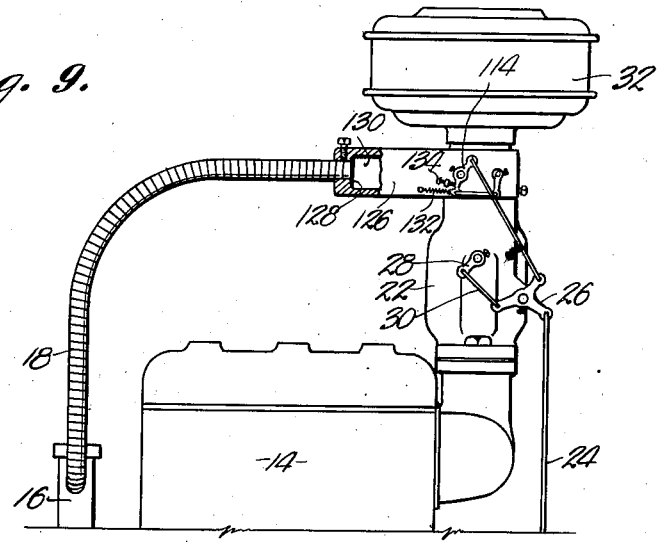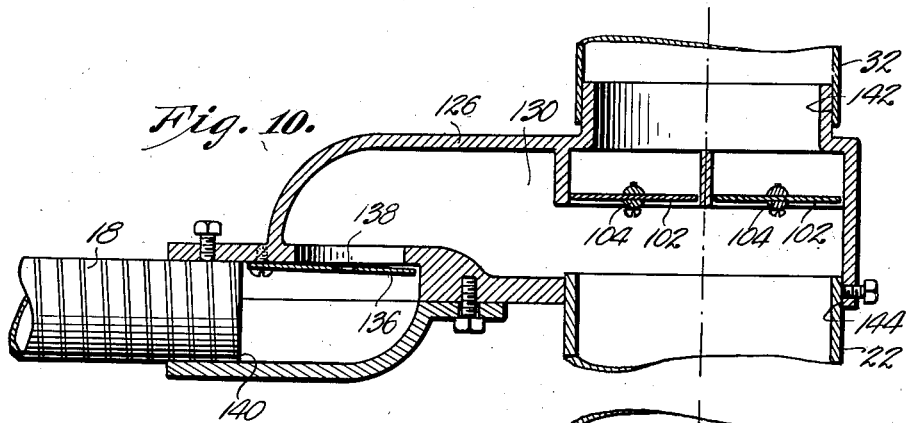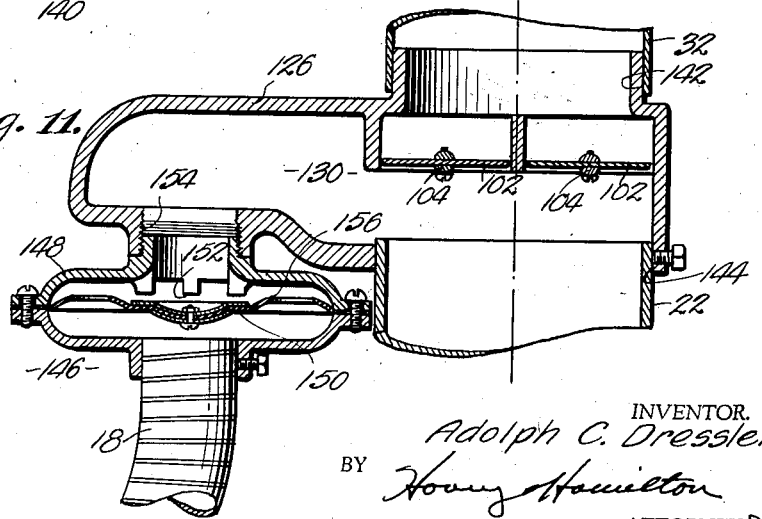

Patented Aug. 26, 1941

2,254,064

UNITED STATES PATENT OFFICE 2,254,064

HEAD FOR ENGINE BREATHER SYSTEMS

Adolph C. Dressler, Miami, Okla., assignor to Dieselair Corporation, Miami, Okla., a corporation of Delaware Application December 4, 1939, Serial No. 307,445

6 Claims. (Cl. 123—119)

This invention relates to engine attachments and particularly, means for automatically withdrawing evolved vapors and fumes from the interior of an internal combustion engine or the like, as fuel is fed thereto to maintain operation.

One of the important aims of the instant invention is to provide means for drawing evolved vapors from within an engine and disposing the same in the stream of air passing to the carburetor, said means including structure whereby the action will be maintained normal and liquids not withdrawn from the crank case to render the action of the said means objectionable.

This invention has for another aim the provision of specially formed and disposed ports and valves of different forms and specific character, all of which may be utilized to attain the desirable end of maintaining the crank case free from vapors.

A yet further aim of this invention is to provide structure for positively and automatically opening and closing the passage from the engine crank case to the carburetor intake as the amount of fuel fed to the carburetor is increased and decreased, respectively, said structure being associated with the throttle rod of the carburetor, in certain instances, and specially formed to automatically function in other forms of the invention.

It is a further object of this invention to provide a novel breather system for engines the function of which is to withdraw vapors and gases from the crank case and deposit the same in a stream of air entering the carburetor, which system has inter-related valves controlling the flow of air through the specially formed head of the system and into the carburetor and an associated valve controlling the flow of vapors.

Another object is to provide by-passing means in a breather system of the aforementioned character, which means will function to constantly evacuate vapors from within the cavities of the engine throughout the time the same is operating either in an idling condition or at higher speeds.

Specific details of construction, illustrating several ways of embodying the concepts of this invention in breather systems for engines are shown in the accompanying drawings, wherein:

Figure 1 is a fragmentary side elevational view of an engine having a breather system made in accordance with this invention, attached thereto.

Fig. 2 is an enlarged fragmentary detailed vertical central sectional view through the breather system head.

Fig. 3 is a cross sectional view looking down on top of casing 52 through the head taken on line III—III of Fig. 2.

Fig. 4 is a fragmentary sectional view through the zone of juncture between the breather system head and the conduit, illustrating a modified form of the invention.

Fig. 5 is a fragmentary vertical sectional view through a portion of the breather system head and associated parts, illustrating still a further modification of the invention.

Fig. 9 is a side elevational view of an internal combustion engine showing a breather system associated therewith, wherein the air passing directly to the carburetor through the head of the system, is controlled by valves attached to the carburetor control rod.

Fig. 10 is an enlarged fragmentary vertical sectional view through the head of the breather system, but illustrating the use of a valve for controlling the passage of vapors into the head; and, Fig. 11 is a vertical central sectional view through the head of a breather system showing the employment of another type of valve for controlling the passage of vapors into the head.

Figure 6:
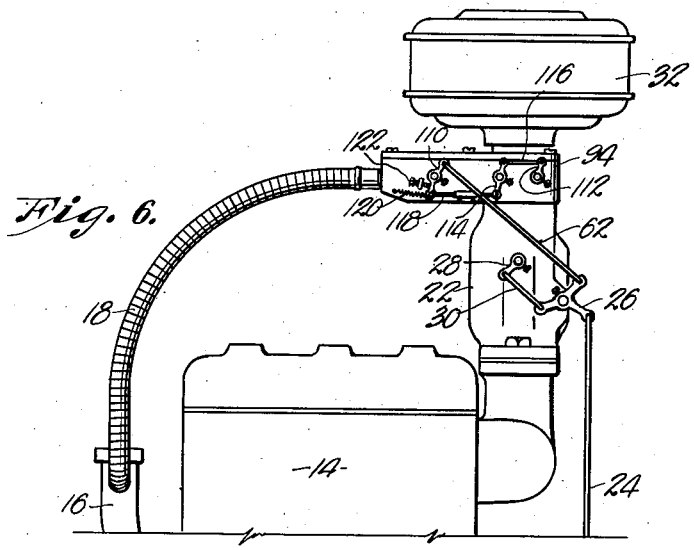
Fig. 6 is a side elevational view of an internal combustion engine illustrating a breather system wherein all valves in the head thereof are joined to the carburetor control.

This application is a continuation, in part, of my co-pending case, Serial No. 273,650, filed May 15, 1939, now Patent No. 2,185,501, dated January 2, 1940 and relating to Breather system for internal combustion engines. The arrangement of parts in said pending application is designed to attain the same ends, but the structure about to be described, is capable of causing the present form of breather system to operate more efficiently and insure the evacuation of the crank case without withdrawing therefrom any solids or liquid in the nature of lubricating oil that is customarily confined therein.

Throughout the views of the drawings to which this specification refers, the numeral 14 is employed to designate an internal combustion engine, the crank case or cavities which are in communication with the neck 16 to which may be joined in any suitable manner, the flexible conduit 18. This conduit 18 joins head 20 that is hollow to form a chamber 21 within which a vacuumatic condition is established when the system is in use.

In all forms of the invention, the carburetor 22 supplying engine 14 with fuel, is operated by the throttle rod 24 in the well-known manner. Rocker arm 26 joined to lever 28 by a link 30 pivotally connected at 26' to the rocker arm 26 and also pivotally joined at 28' to the lever 28 completes the mechanical connection between throttle rod 24 and that portion of the carburetor which supplies a greater or lesser amount of fuel to engine 14 as throttle rod 24 is manually operated. Rod 62 is pivotally joined at 63 to the rocker arm 26 which in turn is connected to the link 30, as just described.

A convention air cleaner 32 receives the air entering carburetor 22 prior to its introduction to said carburetor and it is between this air filter 32 and carburetor 22 that the head, embodying all forms of this invention, is disposed.

Referring particularly to Figs. 1 to 5 inclusive, head 20 has an air intake port 34 and an outlet port 36 that are in alignment. A valve structure detailed in Fig. 2 is employed to control the passage of air through head 20 to carburetor 22. This valve is of the spring-loaded type and comprises a pair of members 38, each of which is hingedly mounted as at 40 to collar 42 that is mounted directly on head 20 by bolts or analogous means 44. Members 38 embrace a reciprocable pin 46 which has an annular groove 48 therein to receive the free ends of a finger 50, one of which is integral with each member 38. The upper portion of pin 46 is housed within a case 52 wherein is disposed coil spring 54, one end of which bears against head 56 of pin 46, while the other end rests upon bridge 58 that extends across intake port 34. Such arrangement insures that a predetermined suction must be created in chamber 21 before members 38 may open to permit passage of air through intake port 34 and thence to carburetor 22.

In the illustrated embodiment shown in Fig. 1, valve 60 is of the butterfly type and joined to 26 by rod 62, one end of which has a slot 64 therein through the medium of which, and pin 66 and arm 68, valve 60 is moved to and from the open position. It is desirable to allow valve 60 to remain open while the engine is idling and to gradually close the same as fuel is fed to engine 14 through carburetor 22 to increase the speed thereof.

The length of slot 64 may be governed to suit conditions such as length and diameter of conduit 18 and the amount of vacuumatic draw that is established in head 20.

During idling, valve 60 should remain open and progressively approach the closed condition as the tendency to draw undesirable liquids or solids through conduit 18 is increased. When valve 60 is partially closed, as would be the case when the engine is under full throttle, a sufficient amount of suction will be present to evacuate evolved vapors from the crank case.

In Figs. 2 to 4, head 20 does not have a valve controlling the vapor intake port 70. Vapor intake port 70 of the form shown in Fig. 2 is controlled by a flap valve 72 having a perforation 74 at the center thereof. This valve 72 is hung on a screw or the like 72, and the action of gravity maintains the same in an opened condition until the vacuumatic condition established in chamber 21, is of sufficient force to draw the same against its seat and thereby close opening 78 that forms a part of the intake opening 70.

When valve 72 is closed, a relatively small amount of vapor is drawn into head 20 through perforation 74, and therefore, when the engine is idling and members 38 are closed, valve 72 will remain open or vapor will enter the head through perforation 74 until members 38 are drawn open by the suction. At this point, valve 72 may assume the opened position because of the reduction in suction at opening 78.

The unique relationship between the elements shown in the illustrated embodiment of Fig. 2, is therefore, conducive to efficient operation.

In Fig. 5, the means for opening and closing vapor intake opening 80 is in the nature of a check valve, generally indicated by the numeral 82, and comprising a housing 84 wherein diaphragm 86 is disposed for movement toward and from seat 88. Flexible arms 90 allow this movement and as the vacuumatic condition in chamber 21 reaches a predetermined point, due to the suction through intake port 34 and outlet port 36, diaphragm 86 is seated to stop the flow of vapors into the head through conduit 18.

In order that the flow might not be entirely stopped when the engine is operating at full speed or thereabouts, a by-pass tube 92 is provided to interconnect conduit 18 and chamber 21 of head 20. This by-pass tube 92 functions generally as does perforation 74, previously described.

Figure 7:
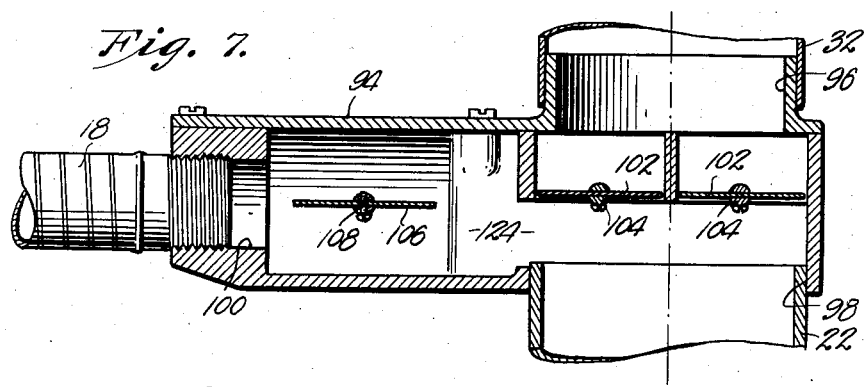
Fig. 7 is an enlarged fragmentary vertical longitudinal central sectional view through the head, illustrated in Fig. 6.
Figure 8:
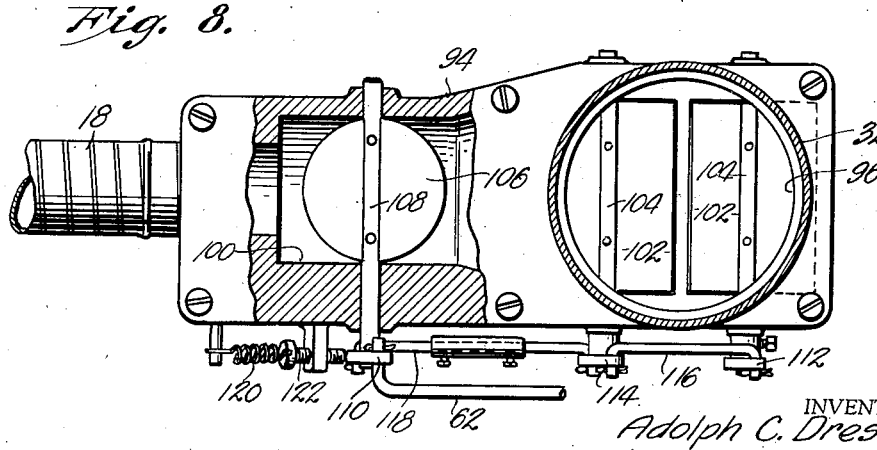
Fig. 8 is a top plan view of the head shown in Fig. 6, parts being broken away for clearness.

In the form of the invention illustrated in Figs. 6 to 8 inclusive, head 94 has an intake port 96 and an outlet port 98 as well as a vapor intake opening 100—the latter is attached to the engine through the medium of conduit 18 and a series of valves are provided to control the passage of air through intake and outlet ports 96 and 98 respectively, and through vapor intake opening 100. Valves 102 are identical in physical structure and are pivotally mounted on shafts 104 which extend exteriorly of head 94.

Valve 106 is pivotally mounted on shaft 108 and may be controlled from a point outside of head 94. Valve 106 is operated through the medium of an arm 110 joined to rod 62 which responds to the movement of throttle rod 24 as hereinbefore mentioned.

Arms 112 and 114 respectively are interconnected by link 116 and arm 114 is joined to arm 110 by an adjustable connecting bar 118. A spring 120 yieldably maintains arm 110 against adjustable stop 122 and when the parts are in the condition shown in Fig. 6, valve 106 is closed.

From the foregoing, it is obvious that movement of rod 62 will simultaneously swing valves 102 and 106 about their axes. As valves 102 are moved from the closed position toward the open position, valve 106 moves from the opened position toward a closed position, thus as the passage of air through intake and outlet ports 96 and 98 is increased, the suction or vacuumatic action created in chamber 124 of head 94, will have a tendency to draw a larger volume of evolved vapors through conduit 18. Since it is necessary to reduce this "pull" through conduit 18, valve 106 will close to the desired degree as valves 102 are opened. This positive action, as the speed of the engine is increased, will insure that the breather system will not withdraw objectionable material from within the crank case of engine 14.

The form of the invention illustrated in Figs. 9 to 11 inclusive, is a combination of the positively actuated valves and the automatic valves heretofore described with respect to the vapor intake opening.

In Fig. 9 head 126 has a vapor intake opening 128 and a chamber 130. The positively actuated valves 102 in this form of head 126 are precisely the same as shown in Figs. 6 to 8 inclusive, but the same are not mechanically joined to any valve which controls vapor intake opening 128. A spring 132 and stop 134 controls the action and position of arm 114 so that valves 102 are yieldably maintained in the closed position as seen in Figs. 10 and 11.

It has been found advantageous to associate a flap valve 136 with valves 102 and the manner of constructing a breather system head of this character, is seen in Fig. 10.

Perforation 138 in valve 136 functions to allow vapors to enter chamber 130 when valve 136 is closed or against its seat so that a relatively small amount of vapor is admitted into head 126 through vapor intake opening 140.

Valves 102 control the passage of air through intake port 142 and outlet port 144 in the same manner as described with respect to Figs. 6 to 8.

In the form of invention seen in Fig. 11, the check valve indicated generally by the numeral 146, has a case 148 and a diaphragm 150 which moves toward and from a series of lugs 152 between which a certain amount of gaseous vapors may enter vapor intake opening 154 in this head 126. The by-pass provided for admitting a relatively small quantity of vapor, is therefore formed in valve 146. Diaphragm 150 has a series of openings 156 which allows the passage of vapors as just set down.

From the foregoing it will be manifest to one skilled in the art, that evolved vapors in the crank case of engine 14 will be withdrawn at a speed commensurate with the requirements at any particular time. The means for controlling the vacuumatic action are sufficient to insure that oil will not be drawn into the carburetor intake of the engine and beyond the automatically and positively controlled elements embodying the invention are capable of attaining the main objectives.

While a large number of physical embodiments of the breather system have been illustrated and described, it is understood that even additional ways of making a breather system are possible without departing from the spirit of the invention.

Having thus described the invention, what is claimed as new and desired to be secured by Letters Patent is:

1. The combination with an internal combustion engine having a carburetor provided with an air intake, of means for drawing evolved vapor from within the crank case to said air intake comprising a hollow head provided with an air intake port and an outlet port in alignment, the latter being in communication with said carburetor intake, and a vapor intake opening; a conduit joining the crank case of the engine and said vapor intake opening; a valve in the head for controlling the passage of air thereinto through said intake port; a second valve at the vapor intake opening; and means for opening and closing said first mentioned valve as the supply of fuel to the carburetor is increased and decreased respectively, said second valve being adapted to approach the closed position as the first mentioned valve approaches the open position.

2. The combination with an internal combustion engine having a carburetor provided with an air intake, of means for drawing evolved vapors from within the crank case to said air intake comprising a hollow head provided with an air intake port and an outlet port in alignment, the latter being in communication with said carburetor intake, and a vapor intake opening; a conduit joining the crank case of the engine and said vapor intake opening; a valve in the head for controlling the passage of air thereinto through said intake port; a second valve at the vapor intake opening; and means joining the first mentioned valve, said second valve and the carburetor control for moving the first mentioned valve from the closed position toward the open position and the second mentioned valve from the open position toward the closed position as the amount of fuel fed through the carburetor is increased.

3. The combination with an internal combustion engine having a carburetor provided with an air intake, of means for drawing evolved vapors from within the crank case to said air intake comprising a hollow head provided with an air intake port and an outlet port in alignment, the latter being in communication with said carburetor intake, and a vapor intake opening; a conduit joining the crank case of the engine and said vapor intake opening; a valve in the head for controlling the passage of air thereinto through said intake port; a second valve at the vapor intake opening; and means for opening and closing said first mentioned valve as the supply of fuel to the carburetor is increased and decreased respectively, said second valve being adapted to approach the closed position as the first mentioned valve approaches the open position, said second valve having a perforation therethrough to allow a relatively small quantity of vapor to enter the head when the said second valve is closed.

4. The combination with an internal combustion engine having a carburetor provided with an air intake, of means for drawing evolved vapors from within the crank case to said air intake comprising a hollow head provided with an air intake port and an outlet port in alignment, the latter being in communication with said carburetor intake, and a vapor intake opening; a conduit joining the crank case of the engine and said vapor intake opening; a valve in the head for controlling the passage of air thereinto through said intake port; a second valve at the vapor intake opening; and means for opening and closing said first mentioned valve as the supply of fuel to the carburetor is increased and decreased respectively, said second valve being adapted to approach the closed position as the first mentioned valve approaches the open position, said second valve having a by-pass forming a part thereof to allow a relatively small quantity of vapor to enter the head when said second valve is closed.

5. The combination with an internal combustion engine having a carburetor provided with an air intake, of means for drawing evolved vapors from within the crank case to said air intake comprising a hollow head provided with an air intake port and an outlet port in alignment, the latter being in communication with said carburetor intake, and a vapor intake opening; a conduit joining the crank case of the engine and said vapor intake opening; a valve in the head for controlling the passage of air thereinto through said intake port; a second valve at the vapor intake opening; and means for opening and closing said first mentioned valve as the supply of fuel to the carburetor is increased and decreased respectively, said second valve being adapted to approach the closed position as the first mentioned valve approaches the open position, said conduit and head having a by-pass tube joining the same and extending around the said second valve whereby to allow a relatively small quantity of vapor to enter the head when said second valve is closed.

6. The combination with an internal combustion engine having a carburetor provided with an air intake, of means for drawing evolved vapors from within the crank case to said air intake comprising a hollow head provided with an air intake port and an outlet port in alignment, the latter being in communication with said carburetor intake, and a vapor intake opening; a conduit joining the crank case of the engine and said vapor intake opening; a valve in the head for controlling the passage of air thereinto through said intake port; and a second valve at the vapor intake opening, said first mentioned valve having yieldable means to hold the same in the closed position until the suction created in the head through the carburetor air intake becomes great enough to overcome the holding force of the said yieldable means.

ADOLPH C. DRESSLER.